US00RE38665E

(19) United States
(12) Reissued Patent
Struck et al.

(10) Patent Number: US RE38,665 E
(45) **Date of Reissued Patent: *Dec. 7, 2004**

(54) WIRELESS SNOW PLOW CONTROL SYSTEM

(75) Inventors: John M. Struck, Iron Ridge, WI (US); Lynn W. Schultz, Campbellsport, WI (US); Terry C. Wendorff, Cedarburg, WI (US)

(73) Assignee: Sno-Way International, Inc., Hartford, WI (US)

( * ) Notice: This patent issued on a continued prosecution application filed under 37 CFR 1.53(d), and is subject to the twenty year patent term provisions of 35 U.S.C. 154(a)(2).

(21) Appl. No.: 08/953,922

(22) Filed: Oct. 20, 1997

Related U.S. Patent Documents

Reissue of:
(64) Patent No.: 5,524,368
Issued: Jun. 11, 1996
Appl. No.: 08/203,545
Filed: Mar. 1, 1994

(51) Int. Cl.[7] ..... E01H 5/04
(52) U.S. Cl. ..... 37/235; 37/414; 180/167
(58) Field of Search ..... 37/234, 907, 382, 37/235, 414, 231, 266, 236; 172/4, 4.5; 180/167; 201/50; 446/456

(56) References Cited

U.S. PATENT DOCUMENTS

| | | | | |
|---|---|---|---|---|
| 2,674,052 A | | 4/1954 | Newkirk | |
| 2,858,625 A | * | 11/1958 | Rivinius | 37/231 X |
| 3,069,983 A | | 12/1962 | Pizzarotti et al. | |
| 3,144,723 A | * | 8/1964 | Carter | 37/414 |
| 3,656,559 A | * | 4/1972 | Lennea et al. | 172/805 |
| 3,761,040 A | * | 9/1973 | Cummins | 244/2 |
| 3,800,902 A | * | 4/1974 | Keller | 180/79.1 |
| 3,934,654 A | | 1/1976 | Stephenson et al. | |
| 3,974,882 A | * | 8/1976 | Eftefield | 172/803 |
| 4,081,092 A | * | 3/1978 | Zimmerman | 172/805 X |
| 4,162,708 A | * | 7/1979 | Johnson | 39/907 X |
| 4,164,821 A | | 8/1979 | Vanchot | |
| 4,318,266 A | * | 3/1982 | Taube | 56/10.2 |
| 4,413,684 A | | 11/1983 | Duncklee | |
| 4,552,226 A | * | 11/1985 | Platter | 172/815 |
| 4,776,750 A | * | 10/1988 | Griswold, Jr. et al. | 37/343 X |
| 4,991,323 A | | 2/1991 | Benkler | |
| 4,999,935 A | * | 3/1991 | Simi et al. | 37/236 |
| 5,158,495 A | * | 10/1992 | Yonezawa | 446/456 |
| 5,174,385 A | | 12/1992 | Shinbo et al. | |
| 5,224,555 A | | 7/1993 | Bain et al. | |
| 5,265,355 A | * | 11/1993 | Daniels | 37/231 |
| 5,284,097 A | * | 2/1994 | Peppin et al. | 105/311.1 |
| 5,647,439 A | * | 7/1997 | Burdick et al. | 172/4.5 |
| 5,778,567 A | * | 7/1998 | Jager et al. | 37/235 |
| 5,909,960 A | * | 6/1999 | Jager et al. | 37/235 |

FOREIGN PATENT DOCUMENTS

| | | |
|---|---|---|
| DE | 2919505 | 11/1979 |
| JP | 59-76332 | 5/1984 |
| JP | 235735 | 9/1989 |
| JP | 216220 | 1/1990 |
| JP | 649865 | 2/1994 |
| JP | 665949 | 3/1994 |
| RU | 000121245 | 1/1959 |

OTHER PUBLICATIONS

John Deere Motor Graders 570B 670B 672B 770B 772B 770B–H 772B–H brochure, pp. 12 & 13, Jan. 1995.*
Hydra–Scoop Snow Plow, Farm Industry News vol. 23, No. 7, p. 25, Jul. 1990.*

* cited by examiner

*Primary Examiner*—Victor Batson
(74) *Attorney, Agent, or Firm*—Reinhart Boerner Van Deuren s.c.

(57) ABSTRACT

A snow plowing system utilizing a wireless radio remote control to control a snow plow mounted to the front of a vehicle. The plowing system comprises a snow plow blade, mounting mechanism connected to the vehicle for mounting the snow plow blade to the vehicle, the snow plow blade being connected to the mounting mechanism, a transmitter for transmitting a signal through a receiver to actuate, a mechanism for controlling the snow plow blade, and the receiver being connected to the mechanism for controlling the snow plow blade.

18 Claims, 1 Drawing Sheet

AMENDED

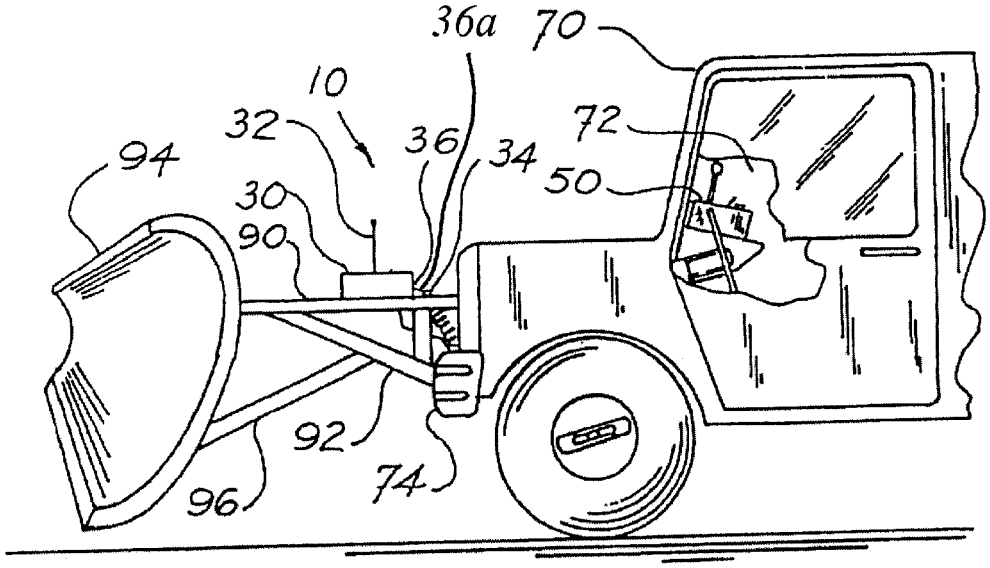
FIG. 1 AMENDED

WIRELESS SNOW PLOW CONTROL SYSTEM

Matter enclosed in heavy brackets [ ] appears in the original patent but forms no part of this reissue specification; matter printed in italics indicates the additions made by reissue.

Please place Disclosure Document No. 343,154 dated 19 Nov. 1993 in the file of this case.

BACKGROUND OF THE INVENTION

The present invention relates generally to snow plow controls for a snow plow of the kind designed to be connected to a vehicle like a car or a truck.

When a snow plow is installed, mounted, or connected to a vehicle, the installation typically requires that a control means, typically a series of switches, lights, and indicators, be mounted within the vehicle. Currently, the various movements and functions of snow plows are controlled by running wires from the lifting and pivoting means of the snow plow to a set of switches mounted within the vehicle cab. The switches at a minimum include a plow lifting and lowering switch and a plow left and right angling switch. Additional switches to control auxiliary plow functions are not uncommon. Electrical wiring must be run from the actuating means mounted on the plow or mounted on the vehicle which perform the various plow movements and functions to the control means mounted within the vehicle cab. The electrical wires must pass through the vehicle's front grill, engine compartments, fire wall, and dashboard in order to be connected to the switches mounted in the vehicle cab. Between the plow and the vehicle, the electrical wires must have a plug and receptacle so that the electrical wires can be disconnected when the plow is removed. Typically, the electrical wires passing through the vehicle and switches within the vehicle cab remain permanently mounted within the vehicle. The present invention eliminates the electrical wires, plug and receptacle, and permanent mounting of the switches by incorporating a wireless remote control.

Because of the amount of labor required to install the wiring and switches in a vehicle to which a snow plow is removably attached, they are typically left in place even when the plow is removed from the vehicle. There are many disadvantages to having permanently mounted plow controls.

First, it is necessary that the plow controls be mounted in a location easily accessible to the operator of the vehicle so that *the* operator can operate the plow without having to reach far distances, move forward in the seat, take his or her eyes off of the road, etc. The result of this necessity is that the controls are often mounted where they can be in the way of the operator or interfere with access to other vehicle controls not used when plowing. This can cause inconvenience when not plowing and when there is no need for the controls to be mounted within the vehicle cab. Thus it is disadvantageous to have the plow controls remain mounted within the vehicle when the plow is not in use and it would be advantageous to be able to move the location of the controls when the vehicle is in use.

Second, the operator of the plow can only operate the plow when he or she is located within the vehicle cab. Often the operator finds it desirable to operate or move the snow plow when not in the vehicle. For example, when the operator makes height adjustments to the plow skids, which control the distance between the bottom edge of the plow (the mold board) and the pavement, it is more convenient for the operator to lower the plow from a remote location in front of the plow instead of constantly exiting and entering the vehicle cab to make the necessary adjustments.

Third, often times the same plow is used on a plurality of vehicles. In this situation, it is necessary to purchase and permanently mount many sets of snow plow controls for separately mounting in the cab of each vehicle. This practice can be expensive and labor consuming.

The inventor knows of no prior art that either teaches or discloses the unique features of the present invention.

SUMMARY OF THE INVENTION

The present invention comprises a wireless remote snow plow control to control a snow plow mounted to the front of a vehicle. The control consists of two principal components. A receiver, which is permanently mounted to the snow plow is connected to the lifting and pivoting means of the plow. A separate transmitter containing the requisite switches for controlling the plow functions can be located wherever the operator of the plow desires. This is typically somewhere within the vehicle cab, but permanent mounting is not required. Furthermore, when the plow is removed the transmitter can be kept with the stored plow because it is not necessary to permanently attach the transmitter to the vehicle. It is undesirable to permanently attach the transmitter to the vehicle. If the same plow is to be used on a separate vehicle, the operator of the separate vehicle need only obtain the transmitter that corresponds with the receiver permanently mounted to the particular snow plow. There is no need to permanently mount a second set of snow plow controls to the second vehicle.

When the operator actuates one of the switches on the transmitter, the transmitter sends a radio signal which is received by the receiver. An electrical signal is then sent from the receiver to the switching or actuating means of the snow plow. Because the transmitter is completely portable, the operator can operate the snow plow from any location provided he is within the transmitting range of the transmitter. Please note that the method of actuation of the controls on the transmitter need not be limited to physical activation but that any type of mechanism capable of activating the transmitter controls could potentially be used; e.g. a voice activated computer control. Therefore, the interpretation given the claims should be broad enough to include this possible alternative structure.

DESCRIPTION OF THE DRAWINGS

FIG. 1 is a side view of a vehicle having a snow plow mounted thereon utilizing the wireless snow plow controls of this invention.

DETAILED DESCRIPTION

Figure 2:
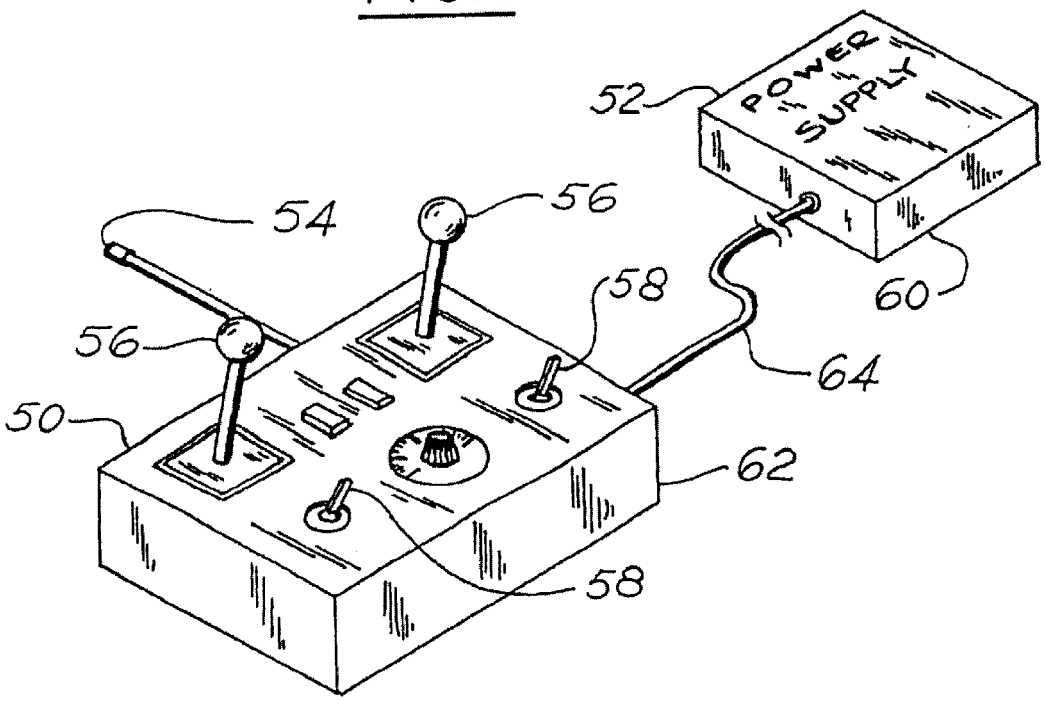
FIG. 2 is a perspective view of the snow plow control transmitter including an external battery pack.

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

The present invention comprises wireless snow plow controls 10 for controlling the movement and functions of a snow plow 90 mounted to a vehicle 70, e.g. a car or truck. The wireless snow plow controls 10 include a transmitter 50 for transmitting radio signals and a receiver 30 for receiving radio signals. The transmitter 50 is portable and can be operated from any location provided it is still within a predetermined transmitting range with respect to the receiver 30. The receiver 30 is typically permanently mounted to the snow plow 90. The receiver 30 receives the radio signals transmitted by the transmitter 50 and then activates the various functions, such as lifting, lowering, angling right, angling left, etc., of the snow plow 90.

Referring to FIG. 1, a snow plow 90 may be seen to be connected to a vehicle 70. The plow 90 includes a plow blade 94 pivotally attached to the front of the plow mounting carriage 92. The mounting carriage 92 includes various known mechanisms 96 for lifting and pivoting the plow blade 94. Depending upon the design of the snow plow 90, some mechanisms 96 may be mounted on the front of the vehicle 74. These mechanisms 96 include hydraulic pumps, electric motors, hydraulic cylinders, levers, gears, pneumatic pumps, pneumatic cylinders, and other means for lifting, angling, and applying pressure to snow plow blades 94.

The other end of the plow mounting carriage 92 is connected to the front of the vehicle 74. The plow mounting carriage 92 is typically attached to the vehicle 70 in such a way that it is easily mounted. Thus the entire plow 90, including control mechanisms 96, can be removed from the vehicle 70 when it is necessary to use vehicle 70 for purposes of plowing snow.

Receiver 30 is typically mounted to plow mounting carriage 92 but could also be mounted anywhere on or within the vehicle 74. Receiver 30 includes an antenna 32 to aid in receiving the plow control radio signals sent by transmitter 50. Receiver 30 has an input wiring harness 34 which includes electrical wires for obtaining power from the vehicle 70 and an output wiring harness [36] *36a* for actuating solenoids and switches for the mechanisms 96 which function to raise, lower and pivot plow blade 94.

Transmitter 50 is a portable unit that can be located by the operator of the plow in any desirable location. This includes within the cab 72 of the vehicle 70 as shown in FIG. 1 or at a location outside of the vehicle cab 72. The only limitation regarding the location of transmitter 50 is that it must be located within a predetermined range of receiver 30 so that the signals transmitted can reach the receiver.

As shown in FIG. 2, transmitter 50 requires a power supply 52. Power supply 52 can be a separate battery pack 60 as shown in FIG. 2, can be a battery pack located within housing 62 of transmitter 50, or transmitter 50 can obtain its power directly from the vehicle 70's power source. For example, power supply wires 64 could be adapted to be plugged into the cigarette lighter of vehicle 70.

Transmitter 50 includes an antenna 54, for purposes of aiding in the transmitting of plow control radio signals to receiver 30 and has a plurality of joystick switches 56 and toggle switches 58 for controlling the movements and positioning of plow 90. For safety reasons, it is important that transmitter 50 be easily accessible to the operator of the vehicle 70 and positioned in a convenient location so that the operator does not have to reach an excessive distance for the controls or take his or her eyes off the road when trying to locate the transmitter 50. Because transmitter 50 is completely portable, the operator can position the transmitter 50 in any desired location, including a location exterior to the vehicle cab 72. This is very convenient, especially when the operator needs to make adjustments to the plow 90 that require the plow 90 to be lifted or angled upon completion to ensure that the adjustments made are correct and do not cause any unforseen problems with the proper operation of the plow 90.

The transmitter 50 is of the type manufactured by Microtronics, Inc. of Humboldt, Kans. known as the MAX-1600 or MAX-3200 and generates an R.F. signal which is FM modulated. The modulation is a 120 bit data stream with start and step bits, information concerning the selected switch being activated and a specialized algorithm developed to ensure the validity of the transmission. Also transmitted [are] *is* address information to enable the transmitter "talk" to its associated receiver. This address information is set so that no two devices will be the same. There may be no limit to the number of wireless snow plow controls 10 used in the same vicinity without any cross-activation.

The receiver 30, also of the type manufactured by Microtronics, Inc. of Humboldt, Kans., receives the radio signal transmitted by the transmitter [60] *50* decodes the data stream and checks for validity of the address and the start and stop bits of the received data. If this is correct, a software algorithm is performed to accept or reject the information to be passed on to the receivers outputs 36. If for any reason this test fails, no output 36 will be sent from receiver 30. Once this test has passed, the appropriate output 36 will be sent. The output 36 activates one of the control mechanisms 96 mounted to the plow mounting carriage 92 for purposes of controlling the plow blade 94's position.

The transmitter 50 and receiver 30 operate on the 5 R.F. channels in accordance with FCC subpart D—Lower Power Communications Devices, Part 15.117. Use of these devices is subject to the provisions of FCC Part 15.103. A license is not required to operate these devices. Finally, and alternatively, the transmitter [60] *50* and receiver 30 may be designed to produce and receive any signal of the electromagnetic spectrum that would allow them to function in the manner described herein.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A [wireless remote] snow plow [control] system *for use with a vehicle, said snow plow system* comprising:

[a single vehicle;]

a snow plow blade;

a *plow* mounting [structure connecting] *carriage having a front and a rear, said rear of said plow mounting carriage being removably connectable to* the *front of the* vehicle [to the], *said* snow plow blade *being pivotally attached to said front of said plow mounting carriage*;

a *self-contained, battery-powered, portable* transmitter [mechanism for transmitting a wireless] *which transmits an R.F. control* signal [to a receiver mechanism within a transmitting range], *said transmitter having controls for selectively raising, lowering, and pivoting said snow plow blade*;

*a receiver which receives said R.F. control signal transmitted by said transmitter and provides, in response to said R.F. control signal received from said transmitter, an output control signal; and* an adjusting mechanism [for moving the] *which raises, lowers, and pivots said* snow plow blade[;] *in response*

*to said output control signal from said receiver, said adjusting mechanism being attached, at least in part, to said plow mounting carriage*

[the receiver mechanism being connected to the adjusting mechanism and the transmitter mechanism having at least one control for activating the adjusting mechanism through the receiver mechanism for adjusting the snow plow blade].

2. [An improved] *A wireless remote* snow plow *control* system for use with a [single] vehicle having a snow plow *system removably* mounted to the vehicle, *the snow plow system* including [a means] *a snow plow blade and an adjusting mechanism* for [adjusting the snow plow mounted thereon, the improvement being a wireless] *raising, lowering, and pivoting the snow plow blade, said wireless remote* snow plow control system comprising:

*a* remote [radio] control [including a] *comprising an R.F.* transmitter [for transmitting a radio] *which transmits an R.F. control* signal [to a receiver within a transmitting range;], *said remote control additionally comprising controls for selectively raising, lowering, and pivoting the snow plow blade;*

[the receiver being mounted to the snow plow system;]

[the] *an R.F. receiver which receives said R.F. control signal transmitted by said R.F. transmitter, said R.F.* receiver [having] *producing* an output [connected] *which is provided* to the [means] *adjusting mechanism* for *controlling the* adjusting *mechanism to raise, lower, and pivot* the snow plow[;] *blade in response to said R.F. control signal received from said R.F. transmitter.*

[the transmitter transmitting radio signals to the receiver;]

[the receiver receiving the radio signals transmitted by the transmitter for adjusting the snow plow.]

3. [An improved apparatus] *Apparatus* for controlling the movement of a snow plow connected to a single vehicle [without the use of electrical wires, the improvements being a wireless snow plow control system], *the snow plow including a snow plow blade which is pivotally mounted at the front of a plow mounting carriage mounted in turn to the front of the vehicle, said apparatus* comprising:

[a radio] *an R.F.* remote control [transmitting means] *transmitter* for transmitting [a radio] *an R.F. control* signal, *said R.F. remote control transmitter also including a first control for raising and lowering the snow plow blade and a second control for pivoting the snow plow blade*;

[a radio] *an R.F.* remote control [receiving means] *receiver* for receiving [the radio] *said R.F. control* signal *from said R.F. remote control transmitter and providing an output control signal*;

[the radio] *an adjusting mechanism for raising, lowering, and pivoting the snow plow blade, said adjusting mechanism being attached, at least in part, to the plow mounting carriage, said R.F.* remote control [receiving means] *receiver* being operatively connected to [an] *said* adjusting mechanism for adjusting [the] *said* snow plow *blade of the snow plow, including at least raising, lowering and pivoting the snow plow blade in response to said output control signal from said receiver*;

the radio remote control [transmitting means] *transmitter* being located [within a transmitting range of] *such that* the radio remote control [receiving means] *receiver can receive the radio signal.*

4. A method for [using a wireless] *controlling the position of a* snow plow [control system including] *blade pivotally mounted on a plow mounting carriage removably connected to the front of* a [single] vehicle, [a snow plow blade, a mounting connecting the vehicle to] the snow plow blade[, a transmitter mechanism transmitting radio signals to a receiver,] *being raised, lowered and pivoted by* an adjusting mechanism [for moving the snow plow blade, the receiver being connected to the adjusting mechanism and the transmitter mechanism having at least one control for activating the adjusting mechanism through the receiver, the] *attached, at least in part, to the plow mounting carriage, said* method comprising:

[activating the transmitter mechanism to send a signal to the receiver; the receiver activating the adjusting mechanism for moving the snow plow blade]

*controlling the position of the snow plow blade with a self-contained, battery-powered, portable R.F. transmitter which transmits an R.F. control signal, said transmitter having controls for raising, lowering, and pivoting the snow plow blade;*

*receiving said R.F. control signal transmitted by said transmitter and providing, in response thereto, an output control signal to the adjusting mechanism to cause the adjusting mechanism to raise, lower, and pivot the snow plow blade in response to manipulation of said controls on said transmitter.*

*5. A snow plow control system for use with a vehicle having a snow plow removably mounted to the vehicle, the snow plow comprising a plow mounting carriage removably mounted to the front of the vehicle, a snow plow blade pivotally mounted at the front of the plow mounting carriage, and an adjusting mechanism for raising, lowering, and pivoting the snow plow blade with respect to the vehicle, said snow plow control system comprising:*

*a remote transmitter which transmits radio frequency snow plow control signals for controlling the adjusting mechanism to selectively control the position of the snow plow blade by raising, lowering, and pivoting the snow plow blade; and*

*a receiver having an output electrically connected to the adjusting mechanism, said receiver being responsive to said radio frequency snow plow control signals transmitted by said transmitter to cause the adjusting mechanism to adjust the snow plow blade in response to the radio frequency snow plow control signals, wherein said transmitter when located in a passenger compartment in the vehicle is capable of transmitting said radio frequency snow plow control signals such that said receiver can receive the snow plow control signals.*

*6. A snow plow control system as defined in claim 5, wherein said receiver is responsive to said radio frequency snow plow control signals to provide an electrical signal for controlling the adjusting mechanism.*

*7. A snow plow control system as defined in claim 5, wherein said receiver is responsive to said radio frequency snow plow control signals to provide an electrical signal for activating a control mechanism of the adjusting mechanism to control the adjustment of the snow plow blade.*

*8. A snow plow control system as defined in claim 5, wherein said transmitter comprises a self-contained, battery-powered, portable device locatable within a passenger compartment of the vehicle or at a location outside of the passenger compartment of the vehicle.*

*9. A snow plow control system as defined in claim 5, wherein said transmitter includes a plurality of control switches operable to select a snow plow function to be provided by the adjusting mechanism.*

*10. A snow plow control system as defined in claim 9, wherein the snow plow control signals include data concerning a control switch operated, and the receiver processes the data to activate a snow plow function.*

*11. A snow plow control system as defined in claim 5, wherein the transmitter transmits address information to the receiver and the receiver checks the validity of the address information prior to enabling the adjusting mechanism to provide a snow plow function.*

*12. A snow plow system for use with a vehicle, the vehicle having a front end, a passenger compartment, and a battery, said snow plow system comprising:*

*a snow plow mounting carriage having a front and a rear, said rear of said snow plow mounting carriage being removably mountable to the vehicle at the front end thereof;*

*a snow plow blade pivotally mounted onto said front of said snow plow mounting carriage, said snow plow blade thereby being pivotable with respect to said front of said snow plow mounting carriage to thereby angle said snow plow blade between a range of positions from a fully rightward position to a fully leftward position;*

*a first snow plow blade adjusting mechanism mounted on said snow plow mounting carriage and mechanically coupled to said snow plow blade, said first snow plow blade adjusting mechanism being operable to drive said snow plow blade to pivot with respect to said front of said snow plow mounting carriage between said range of positions from a fully rightward position to a fully leftward position;*

*a second snow plow blade adjusting mechanism mechanically coupled to said snow plow mounting carriage, said second snow plow blade adjusting mechanism being operable to raise and lower said snow plow blade; and*

*a remote control system for operating said first and second snow plow blade adjusting mechanisms, said remote control system comprising:*

*a transmitter which transmits radio frequency snow plow control signals;*

*controls located on said transmitter for providing operator inputs to raise, lower, and pivot said snow plow blade, said controls when actuated causing said transmitter to transmit radio frequency snow plow control signals containing information as to the desired adjustment of said snow plow blade; and*

*a receiver which is electrically connected to said first and second snow plow blade adjusting mechanisms, said receiver receiving said radio frequency snow plow control signals transmitted by said transmitter and providing, in response to said radio frequency snow plow control signals, electrical output signals to said first and second snow plow blade adjusting mechanisms to cause said first and second snow plow adjusting mechanisms to adjust said snow plow blade in a manner conforming with the operator inputs to said controls on said transmitter.*

*13. A snow plow system as defined in claim 12, wherein said first and second snow plow blade adjusting mechanisms are carried by the snow plow mounting carriage and are removable from the vehicle together with said snow plow mounting carriage.*

*14. A snow plow system as defined in claim 12, wherein said receiver is mounted on said snow plow mounting carriage and is removable from the vehicle together with said snow plow mounting carriage.*

*15. A snow plow system as defined in claim 12, additionally comprising: electrical power supply wires for supplying electrical power from the battery of the vehicle to said receiver, said electrical power supply wires being the only electrical connection between the vehicle and said remote control system.*

*16. A snow plow system as defined in claim 12, wherein said transmitter comprises: a self-contained, battery-powered, portable device locatable within the passenger compartment of the vehicle or at a location outside of the passenger compartment of the vehicle.*

*17. A snow plow control system for use with a vehicle having a snow plow including a snow plow blade removably mounted to the vehicle using a plow mounting carriage, the snow plow further including an adjusting mechanism for adjusting the position of the snow plow blade by raising, lowering and pivoting the snow plow blade, the snow plow control system comprising:*

*a self-contained, battery-powered, portable remote control comprising a transmitter for transmitting an R.F. control signal; and*

*a receiver for receiving said R.F. control signal transmitted by said transmitter and for providing, in response to said R.F. control signal, an output control signal to the adjusting mechanism to cause the adjusting mechanism to raise, lower, and pivot the snow plow blade in a desired fashion.*

*18. A snow plow control system for controlling the movement of a snow plow removably mounted to a vehicle, the snow plow control system comprising:*

*a remote control transmitter for transmitting an R.F. signal; and*

*a remote control receiver for receiving said R.F. signal; wherein said remote control receiver is operatively connected to an adjusting mechanism for adjusting a snow plow blade of the snow plow in response to said R.F. signal, including at least raising, lowering and pivoting the snow plow blade; and*

*wherein said remote control transmitter is located such that said remote control receiver can receive the signal.*

* * * * *